(12) United States Patent
Goll et al.

(10) Patent No.: US 9,421,483 B2
(45) Date of Patent: Aug. 23, 2016

(54) PRE-FILTER FOR FUEL MODULE

(71) Applicant: Continental Automotive Systems, Inc., Auburn Hills, MI (US)

(72) Inventors: Brandon Goll, Lake Orion, MI (US); Cristina Malek Guerrieri, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 251 days.

(21) Appl. No.: 14/098,889

(22) Filed: Dec. 6, 2013

(65) Prior Publication Data

US 2014/0158606 A1    Jun. 12, 2014

Related U.S. Application Data

(60) Provisional application No. 61/736,106, filed on Dec. 12, 2012.

(51) Int. Cl.
*B01D 35/00* (2006.01)
*B01D 35/30* (2006.01)
*B01D 35/027* (2006.01)

(52) U.S. Cl.
CPC .......... *B01D 35/005* (2013.01); *B01D 35/0276* (2013.01); *B01D 35/30* (2013.01)

(58) Field of Classification Search
None
See application file for complete search history.

(56) References Cited

U.S. PATENT DOCUMENTS

| | | | | |
|---|---|---|---|---|
| 4,420,396 A * | 12/1983 | Yamamoto | ............. | B01D 29/15 210/172.4 |
| 4,684,463 A * | 8/1987 | Mizusawa | .......... | B01D 35/0273 210/172.3 |
| 7,182,869 B2 * | 2/2007 | Catlin | ................ | B01D 35/0273 210/315 |
| 7,964,096 B2 * | 6/2011 | Kimisawa | ............ | F02M 37/025 123/509 |

OTHER PUBLICATIONS

Search Report and the Written Opinion of the International Searching Authority dated Feb. 14, 2014. PCT/US2013/073854.

* cited by examiner

*Primary Examiner* — Benjamin Kurtz

(57) ABSTRACT

A pre-filter for a fuel pump in a fuel module which includes a housing having a first portion and a second portion that form a channel when the portions are connected together. There is a first port and a second port integrally formed as part of the second portion, and the channel allows for fuel flow between a valve, such as a thermostatic valve in fluid communication with the first port, and a fuel pump in fluid communication with the second port. Both the valve and the pump are connected to the pre-filter. A first portion of the housing includes a mesh, and a second portion of the housing also includes a mesh, which allow for fuel disposed in a reservoir to flow through each mesh and into the second port, providing additional fuel flow to supplement the fuel flow from the thermostatic valve.

22 Claims, 4 Drawing Sheets

PRE-FILTER FOR FUEL MODULE

CROSS-REFERENCE TO RELATED APPLICATIONS

This application claims the benefit of U.S. Provisional Application No. 61/736,106 filed Dec. 12, 2012. The disclosure of the above application is incorporated herein by reference.

FIELD OF THE INVENTION

The invention relates generally to a fuel pump pre-filter for a fuel module having a channel for providing fluid communication between one or more ports.

BACKGROUND OF THE INVENTION

Fuel pump pre-filters are commonly used in fuel systems to eliminate unwanted particles and debris from the fuel before it is ingested by the fuel pump. Fuel pump pre-filters located inside of a fuel tank are often part of a fuel module, which includes a fuel pump and various valves. Due to the size and shape of different fuel tanks, it is advantageous to have a fuel module which is able to meet smaller packaging requirements to fit inside fuel tanks of different shapes. However, if secondary functions of the pre-filter are required, such as directing fuel flow from other components of the fuel module, most current designs for filters used in fuel modules do not have the ability to accommodate smaller packaging requirements, as well as provide suitable filtering of fuel prior to entering the fuel pump.

Accordingly, there exists a need for a fuel pump pre-filter which provides suitable filtering and flow direction capabilities, while accommodating smaller packaging requirements.

SUMMARY OF THE INVENTION

The present invention is a pre-filter for a fuel module which includes a housing having a first portion and a second portion that form a channel when the portions are connected together. There is a first port and a second port integrally formed as part of the second portion, and the channel allows for fuel flow between a valve, such as a thermostatic valve in fluid communication with the first port, and a fuel pump in fluid communication with the second port. Both the valve and the pump are connected to the pre-filter. A first portion of the housing includes a mesh, and a second portion of the housing also includes a mesh, which allow for fuel disposed in a reservoir to flow through each mesh and into the second port, providing additional fuel flow to supplement the fuel flow from the thermostatic valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
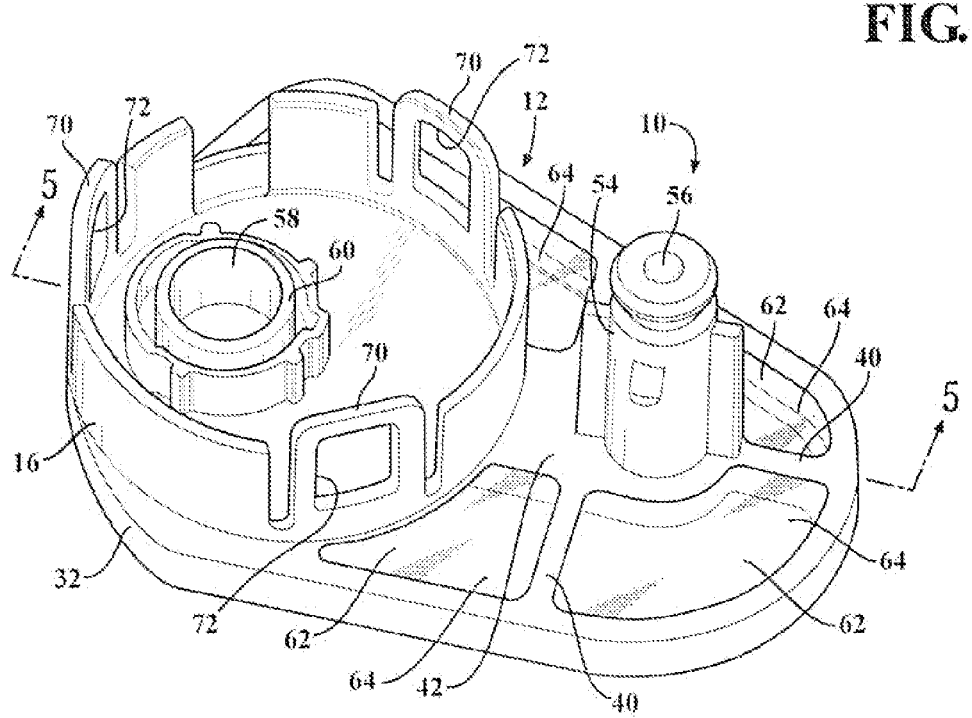
FIG. 1 is a first perspective view of a pre-filter for a fuel module, according to embodiments of the present invention.
Figure 2:
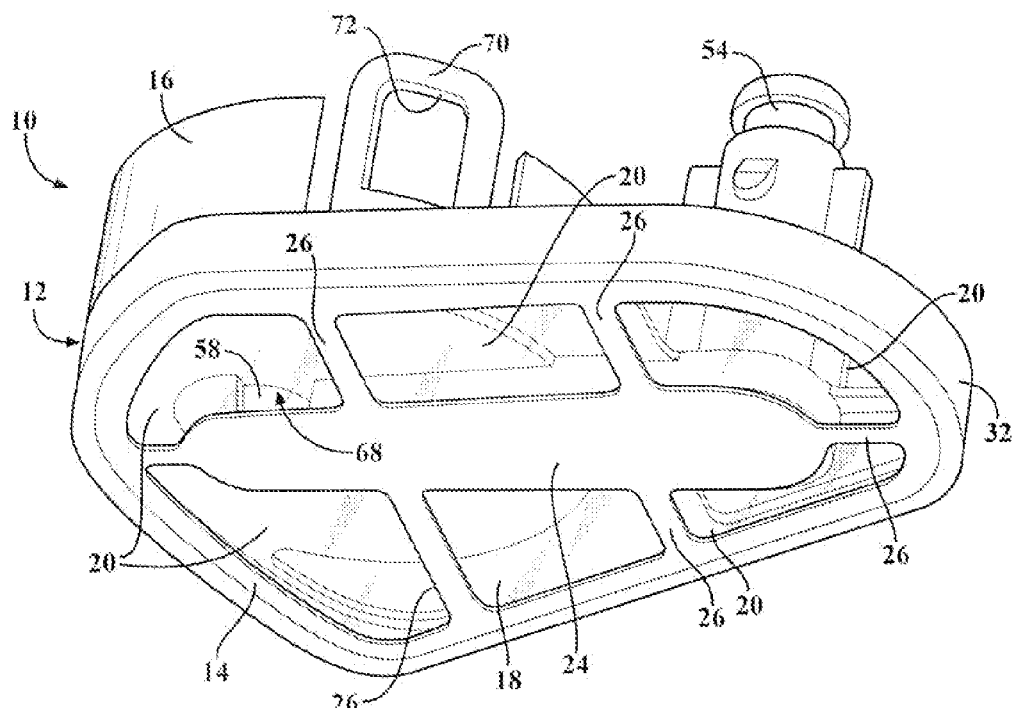
FIG. 2 is a second perspective view of a pre-filter for a fuel module, according to embodiments of the present invention.
Figure 3:
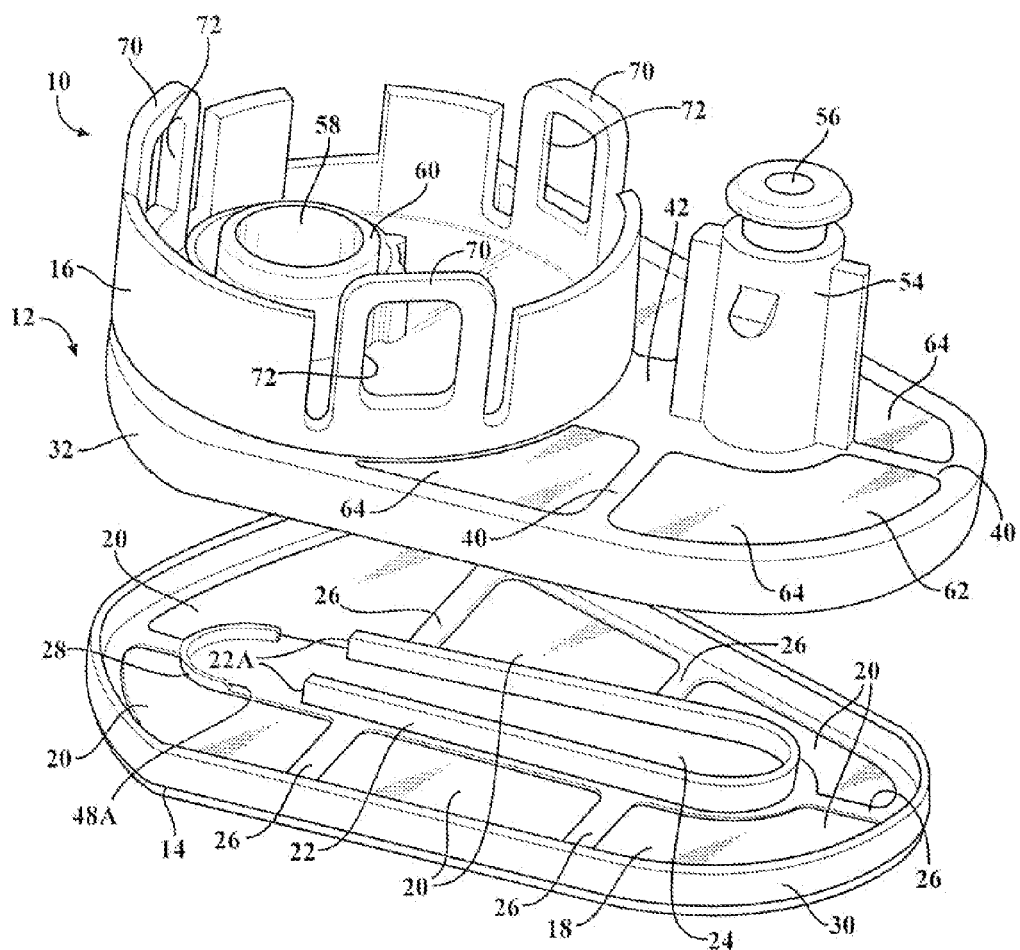
FIG. 3 is a first exploded view of a pre-filter for a fuel module, according to embodiments of the present invention.
Figure 4:
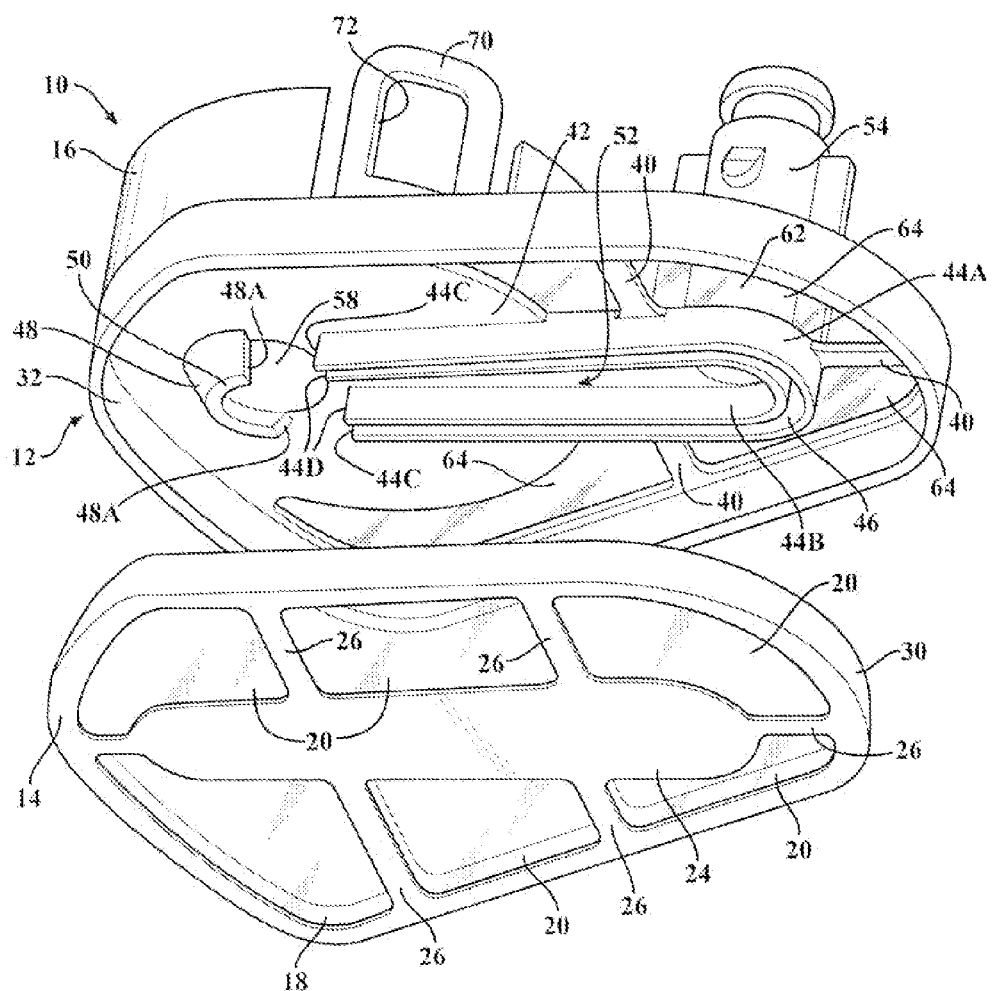
FIG. 4 is a second exploded view of a pre-filter for a fuel module, according to embodiments of the present invention.
Figure 5:
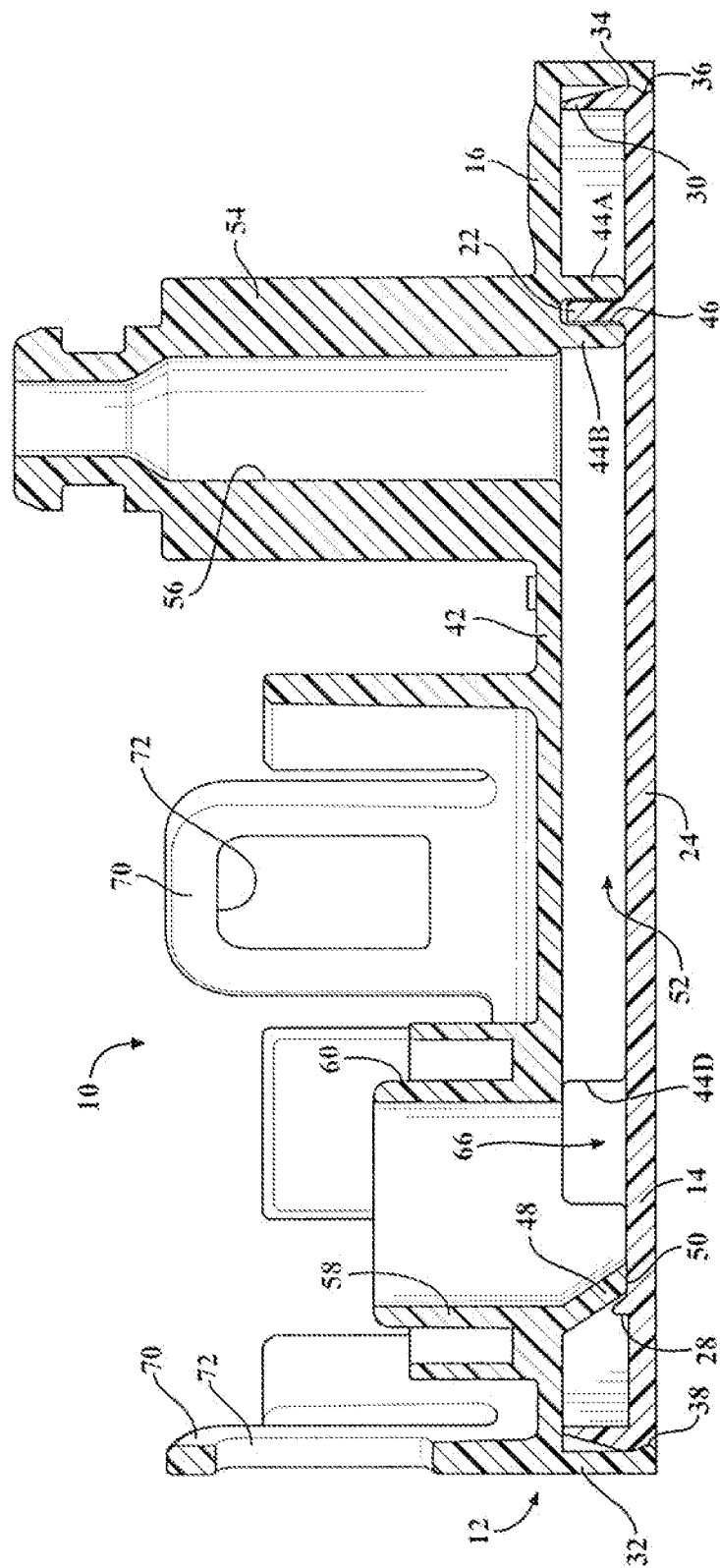
FIG. 5 is a cross-sectional view taken along lines 5-5 of FIG. 1, according to embodiments of the present invention.

A pre-filter for a fuel module according to the present invention is shown in the Figures generally at 10. The pre-filter 10 includes a housing, shown generally at 12, having a first portion 14 and a second portion 16. Integrally molded as part of the first portion 14 is a lower mesh 18, and the first portion 14 also includes a first plurality of flow areas 20, where portions of the lower mesh 18 are disposed in the flow areas 20. Fuel flows through the areas of the lower mesh 18 disposed in the flow areas 20 during the operation of the filter 10. Also integrally formed as part of the first portion 14 is a ridge 22, which in this embodiment is a U-shaped ridge 22. More specifically, the ridge 22 is integrally formed with a support plate 24, and the support plate 24 is formed with several frame supports 26. The lower mesh 18 is formed with the support plate 24 and the frame supports 26 to form the flow areas 20. The first portion 14 also has a second ridge 28, which is also integrally formed with the support plate 24. The first ridge 22 and the second ridge 28 are located on the same side of the support plate 24, best shown in FIGS. 3 and 5.

Referring again to the Figures generally, on the outer periphery of the first portion 14 is an outer flange 30 which is used for connecting the first portion 14 to the second portion 16. The second portion 16 includes a corresponding outer flange 32 which substantially surrounds the outer flange 30 of the first portion 14, when the second portion 16 is attached to the first portion 14, best shown in FIG. 5. The outer flange 30 of the first portion 14 includes a first protrusion 34 and a groove 36, and the outer flange 32 of the second portion 16 has a second protrusion 38 which, during assembly, slides over the first protrusion 34 and locates in the groove 36, providing a snap-fit and sealed connection between the first portion 14 and the second portion 16.

The second portion 16 also includes several frame supports 40, which are connected to a support member 42. Integrally formed as part of the support member 42 are a two flanges 44A,44B which are substantially U-shaped, and form a groove 46, such that the shape of the groove 46 substantially corresponds to the shape of the ridge 22, allowing the ridge 22 to be disposed in the groove 46 when the first portion 14 is connected to the second portion 16. The second portion 16 also includes a conical flange 48, which is also integrally formed as part of the support member 42. When the first portion 14 is connected to the second portion 16, part of the conical flange 48 interfaces to the second ridge 28, a lower surface 50 of the conical flange 48 contacts the support plate 24, and the flanges 44A,44B contact the support plate 24, forming a portion of a channel, shown generally at 52.

Integrally formed with the support member 42 is a first port 54 having an aperture 56 in fluid communication with the channel 52. Also in fluid communication with the channel 52 is an aperture 58 of a second port 60, and the second port 60 is also integrally formed with the support member 42.

The second portion 16 also includes an upper mesh 62, which is integrally formed with the frame supports 40 and the support member 42 of the second portion 16, such that a second plurality of flow areas 64 are formed, where portions of the upper mesh 62 are disposed in the flow areas 64. Fuel flows through the areas of the upper mesh 62 disposed in the flow areas 64 during the operation of the filter 10. When the first portion 14 and second portion 16 are connected together, a first lower flow area, shown generally at 66, and a second lower flow area, shown generally at 68, are formed in the area between the edges 48A of the conical flange 48 and the edges 44C,44D of the flanges 44A,44B and edges 22A of the ridge 22, as well as the area between the support plate 24 and the support member 42. Fuel passing through the upper mesh 62 and the lower mesh 18 is also allowed to pass through the lower flow areas 66,68 into and through the second port 60.

The filter 10 is connected to a retainer holding a fuel pump through the use of a plurality of clipping features 70. The clipping features 70 also include apertures 72 which are used to connect the retainer to the filter 10. In operation, fuel is dispensed to the filter 10 through the use of a thermostatic valve that is in fluid communication with the aperture 56 first port 54. The fuel then flows from the aperture 56 of the first port 54, through the channel 52, and through the aperture 58 of the second port 60, where the fuel then flows into a fuel pump. The filter 10 is disposed in a reservoir, and fuel in the reservoir flows through the flow areas 20 of the lower mesh 18 and the flow areas 64 of the upper mesh 62, and then passes through the lower flow areas 66,68, and through the second port 60. The channel 52 that is formed by the connection of the portions 14,16 of the housing 12 provides for fluid communication between the ports 54,60, and therefore provide fluid communication between the thermostatic valve and the fuel pump. The pre-filter 10 of the present invention is suitable for different types of fuels, such as, but not limited to, diesel fuel, gasoline, ethanol, and the like.

The integration of the channel 52 into the pre-filter 10 allows for reduced packaging, and reduces the number of components needed to hydraulically connect a valve, such as the thermostatic valve, to the fuel pump. The materials used to make the pre-filter 10 may be conductive or non-conductive to deal with any electrostatic discharge. In the case of the material being made of a conductive material, the pre-filter 10 is grounded to a mating component.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
a pre-filter, including:
a first portion of a housing;
a lower mesh integrally formed with the first portion;
a second portion of the housing connected to the first portion;
a first port formed as part of the second portion of the housing;
a second port formed as part of the second portion of the housing;
a channel formed by the connection between the first portion of the housing and the second portion of the housing;
a ridge formed as part of the first portion;
a first flange formed as part of the second portion; and
a second flange formed as part of the second portion;
wherein the ridge is located between the first flange and the second flange when the first portion is connected to the second portion, forming at least a portion of the channel, and the channel provides fluid communication between the first port and the second port, such that fuel flows from the first port, through the channel, and into the second port, and fuel flows through the lower mesh and into the channel.

2. The apparatus of claim 1, further comprising a support plate formed as part of the first portion, wherein the first flange formed as part of the second portion contacts the support plate when the first portion is assembled to the second portion such that the support plate forms part of the channel.

3. The apparatus of claim 1, further comprising:
a conical flange formed as part of the second portion such that the conical flange forms at least a portion of the channel; and
a second ridge formed as part of the first portion;
wherein the conical flange is supported by the second ridge when the first portion is connected to the second portion.

4. The apparatus of claim 3, further comprising:
a first lower flow area located between the conical flange and the first flange; and
a second lower flow area located in between the conical flange and the first flange in proximity to the first lower flow area;
wherein fuel passes through the first lower flow area and the second lower flow area into the channel.

5. The apparatus of claim 1, further comprising:
an upper mesh integrally formed with the second portion;
wherein fuel flows through the upper mesh and into the channel.

6. The apparatus of claim 5, further comprising:
a first plurality of frame supports formed as part of the first portion;
a first plurality of flow areas located in proximity to each of the first plurality of frame supports;
a second plurality of frame supports formed as part of the second portion;
a second plurality of flow areas located in proximity to each of the second plurality of frame supports;
wherein at least a portion of the lower mesh is disposed in one or more of the first plurality of flow areas and at least a portion of the upper mesh is disposed in one or more of the second plurality of flow areas such that fuel flows through the upper mesh and the lower mesh prior to flowing into the channel.

7. The apparatus of claim 1, further comprising:
an outer flange formed as part of the first portion;
a first protrusion integrally formed with the outer flange formed as part of the first portion;
a groove formed as part of the first portion in proximity to the first protrusion;
an outer flange formed as part of the second portion; and
a second protrusion integrally formed with the outer flange formed as part of the second portion;
wherein the second protrusion is disposed in the groove, and the first protrusion is adjacent the second protrusion when the first portion is connected to the second portion.

8. The apparatus of claim 7, wherein the outer flange formed as part of the first portion substantially surrounds the outer flange formed as part of the second portion when the first portion is connected to the second portion.

9. A pre-filter, comprising:
a housing having a first portion and a second portion;
a first port formed as part of the second portion;

a channel formed by the connection of the first portion to the second portion, the first port in fluid communication with the channel;
a second port formed as part of the second portion, the second port in fluid communication with the channel;
a lower mesh integrally formed with the first portion;
an upper mesh integrally formed as part of the second portion;
a support plate formed as part of the first portion; and
a conical flange integrally formed as part of the second portion;
wherein the conical flange contacts the support plate when the first portion is connected to the second portion such that the conical flange forms part of the channel, and fuel flows from the first port into the channel, fuel flows through the upper mesh and the lower mesh into the channel, and fuel flows from the channel into the second port.

10. The pre-filter of claim 9, further comprising:
a first plurality of frame supports formed as part of the first portion;
a first plurality of flow areas formed by the configuration of the first plurality of frame supports;
a second plurality of frame supports formed as part of the second portion; and
a second plurality of flow areas formed by the configuration of the second plurality of frame supports;
wherein a portion of the lower mesh is integrally formed with the first plurality of frame supports such that at least a portion of the lower mesh is disposed in one or more of the first plurality of flow areas, and a portion of the upper mesh is integrally formed with the second plurality of frame supports such that at least a portion of the upper mesh is disposed in one or more of the second plurality of flow areas.

11. The pre-filter of claim 9, further comprising a first flange formed as part of the second portion, wherein the conical flange and the first flange form at least a portion of the channel.

12. The pre-filter of claim 11, further comprising:
a second flange formed as part of the second portion; and
a ridge formed as part of the first portion;
wherein the ridge is disposed between the first flange and the second flange when the first portion is connected to the second portion.

13. The pre-filter of claim 11, further comprising:
a first lower flow area located between the conical flange and the first flange; and
a second lower flow area located in between the conical flange and the first flange in proximity to the first lower flow area;
wherein fuel passes through the first lower flow area and the second lower flow area into the channel.

14. The pre-filter of claim 9, further comprising a second ridge formed as part of the support plate such that at least a part of the conical flange is supported by the second ridge when the first portion is connected to the second portion.

15. The pre-filter of claim 9, further comprising:
an outer flange formed as part of the first portion;
a first protrusion integrally formed with the outer flange formed as part of the first portion;
a groove formed as part of the first portion in proximity to the first protrusion;
an outer flange formed as part of the second portion; and
a second protrusion integrally formed with the outer flange formed as part of the second portion;
wherein the second protrusion is disposed in the groove, and the first protrusion is adjacent the second protrusion when the first portion is connected to the second portion.

16. The pre-filter of claim 9, wherein the outer flange formed as part of the first portion substantially surrounds the outer flange formed as part of the second portion when the first portion is connected to the second portion.

17. A pre-filter for a fuel module, comprising:
a housing having a first portion and a second portion;
a first port formed as part of the second portion;
a channel formed by the connection of the first portion to the second portion, the first port in fluid communication with the channel;
a second port formed as part of the second portion, the second port in fluid communication with the channel;
a first plurality of frame supports formed as part of the first portion;
a first plurality of flow areas formed by the first plurality of frame supports;
a lower mesh integrally formed with the first portion such that at least a portion of the lower mesh is located in one or more of the first plurality of flow areas;
a second plurality of frame supports formed as part of the second portion;
a second plurality of flow areas formed by the first plurality of frame supports;
an upper mesh integrally formed with the first portion such that at least a portion of the upper mesh is located in one or more of the second plurality of flow areas;
a support plate formed as part of the first portion;
at least one flange formed as part of the second portion; and
a conical flange formed as part of the second portion;
wherein the at least one flange and the conical flange contact the support plate to form the channel when the first portion is connected to the second portion, and fuel flows from the first port into the channel, fuel passes through the upper mesh into the channel and through the lower mesh into the channel, and fuel in the channel flows into the second port.

18. The pre-filter for a fuel module of claim 17, further comprising:
a ridge formed as part of the first portion; and
a second flange formed as part of the second portion;
wherein the at least one flange is a first flange, and the ridge is located between the first flange and the second flange when the first portion is connected to the second portion.

19. The pre-filter for a fuel module of claim 17, further comprising a second ridge formed as part of the first portion, wherein part of the conical flange is supported by the second ridge when the first portion is connected to the second portion.

20. The pre-filter for a fuel module of claim 17, further comprising:
a first lower flow area located between the conical flange and the at least one flange; and
a second lower flow area located in between the conical flange and the at least one flange in proximity to the first lower flow area;
wherein fuel passes through the first lower flow area and the second lower flow area into the channel.

21. The pre-filter for a fuel module of claim 17, further comprising:
an outer flange formed as part of the first portion;
a first protrusion integrally formed with the outer flange formed as part of the first portion;
a groove formed as part of the first portion in proximity to the first protrusion;

an outer flange formed as part of the second portion; and
a second protrusion integrally formed with the outer flange formed as part of the second portion;
wherein the second protrusion is disposed in the groove, and the first protrusion is adjacent the second protrusion when the first portion is connected to the second portion.

22. The pre-filter for a fuel module of claim 21, wherein the outer flange formed as part of the first portion substantially surrounds the outer flange formed as part of the second portion when the first portion is connected to the second portion.

* * * * *